US012654436B2

(12) United States Patent　　　　(10) Patent No.:　US 12,654,436 B2
Maurer et al.　　　　　　　　　　　(45) Date of Patent:　Jun. 16, 2026

(54) CAN DECORATOR HAVING PLATE CYLINDER LOCKING MECHANISM

(71) Applicant: Stolle Machinery Company, LLC, Centennial, CO (US)

(72) Inventors: Joseph John Allen Maurer, Aurora, CO (US); Byron Lee Kajfosz, Littleton, CO (US); Stephen Dane Christensen, Highlands Ranch, CO (US)

(73) Assignee: STOLLE MACHINERY COMPANY, LLC, Centennial, CO (US)

( * ) Notice: Subject to any disclaimer, the term of this patent is extended or adjusted under 35 U.S.C. 154(b) by 0 days.

(21) Appl. No.: 18/637,588

(22) Filed: Apr. 17, 2024

(65) Prior Publication Data

US 2024/0351329 A1　　Oct. 24, 2024

Related U.S. Application Data

(60) Provisional application No. 63/460,939, filed on Apr. 21, 2023.

(51) Int. Cl.
*B41F 13/20*　　　　(2006.01)
*B41F 13/008*　　　 (2006.01)
(Continued)

(52) U.S. Cl.
CPC .......... *B41F 27/105* (2013.01); *B41F 13/008* (2013.01); *B41F 13/20* (2013.01); *B41F 17/22* (2013.01); *B41F 33/00* (2013.01); *B25J 5/02* (2013.01); *B41P 2227/62* (2013.01); *B41P 2227/63* (2013.01)

(58) Field of Classification Search
USPC ......................................... 101/477, 479, 480
See application file for complete search history.

(56) References Cited

U.S. PATENT DOCUMENTS 5,044,055 A　　9/1991　Howarth et al.
6,267,056 B1 *　7/2001　Kolbe ................. B41F 13/0008
　　　　　　　　　　　　　　　　　　　101/375
(Continued)

FOREIGN PATENT DOCUMENTS

WO　　　2019039176 A1　　2/2019
WO　　　2020092843 A9　　5/2020

OTHER PUBLICATIONS

Commissioner for Patents ISA/US, PCT/US24/24859, International Search Report and Written Opinion, Sep. 11, 2024, 21 pages.

*Primary Examiner* — Leslie J Evanisko
(74) *Attorney, Agent, or Firm* — Eckert Seamans Cherin & Mellott, LLC

(57)　　　　　　ABSTRACT

A can decorator includes a plate cylinder shaft, a plate cylinder structured to be installed on the plate cylinder shaft, and a plate cylinder locking and unlocking mechanism structured to selectively lock the plate cylinder to the plate cylinder shaft such that the plate cylinder shaft and plate cylinder rotate in conjunction and to selectively unlock the plate cylinder from the plate cylinder shaft such that plate cylinder shaft and plate cylinder do not rotate in conjunction and the plate cylinder is permitted to be removed from the plate cylinder shaft. The plate cylinder locking and unlocking mechanism uses at least one of pneumatic, magnetic, and mechanical power to selectively lock and unlock the plate cylinder.

8 Claims, 7 Drawing Sheets

(51) Int. Cl.

| | | |
|---|---|---|
| *B41F 13/10* | (2006.01) | |
| *B41F 17/22* | (2006.01) | |
| *B41F 27/10* | (2006.01) | |
| *B41F 33/00* | (2006.01) | |
| *B25J 5/02* | (2006.01) | |

(56) References Cited

U.S. PATENT DOCUMENTS

| | | | |
|---|---|---|---|
| 10,022,953 | B2 | 7/2018 | Hughes et al. |
| 10,500,838 | B2 | 12/2019 | Egerton et al. |
| 10,549,525 | B2 | 2/2020 | Chishiki et al. |
| 11,433,662 | B2 | 9/2022 | Sebesta et al. |
| 2005/0139109 | A1* | 6/2005 | Plasswich ........... B41F 13/0016 |
| | | | 101/477 |
| 2010/0005988 | A1 | 1/2010 | Takahashi et al. |
| 2014/0116278 | A1* | 5/2014 | Plasswich ............. B41F 13/193 |
| | | | 101/477 |
| 2015/0174892 | A1* | 6/2015 | Izume ..................... B41F 31/22 |
| | | | 101/363 |
| 2018/0009216 | A1 | 1/2018 | Egerton et al. |

* cited by examiner

CAN DECORATOR HAVING PLATE CYLINDER LOCKING MECHANISM

CROSS REFERENCE TO RELATED APPLICATIONS

This application claims priority to U.S. Patent Application Ser. No. 63/460,939, filed Apr. 21, 2023, entitled, Can Decorator And Plate Cylinder Locking Mechanism, Replacement System, And Timing Adjustment System And Method Therefor.

FIELD OF THE INVENTION

The disclosed concept relates generally to a can decorator used in the food and beverage packaging industries.

BACKGROUND OF THE INVENTION

High speed continuous motion machines for decorating cans, commonly referred to as "can decorator machines" or simply "can decorators," are generally well known. FIG. 1 shows a can decorator. As shown in FIG. 1, a can decorator includes an infeed conveyor 15, which receives cans 16 from a can supply (not shown) and directs them to arcuate cradles or pockets 17 along the periphery of spaced parallel rings secured to a pocket wheel 12. The pocket wheel 12 is fixedly secured to a continuously rotating mandrel carrier wheel 18, which in turn is keyed to a continuously rotating horizontal drive shaft 19. Horizontal spindles or mandrels (not shown), each being pivotable about its own axis, are mounted to the mandrel carrier wheel 18 adjacent its periphery. Downstream from the infeed conveyor 15, each spindle or mandrel is in closely spaced axial alignment with an individual pocket 17, and undecorated cans 16 are transferred from the pockets 17 to the mandrels. Suction applied through an axial passage of the mandrel draws the can 16 to a final seated position on the mandrel.

While mounted on a mandrel, each can 16 is decorated by being brought into engagement with a blanket (e.g., without limitation, a replaceable adhesive-backed piece of rubber) disposed on a blanket wheel of the multicolor printing unit indicated generally by reference numeral 22. Thereafter, and while still mounted on the mandrels, the outside of each decorated can 16 is coated with a protective film of varnish applied by engagement with the periphery of a varnish applicator roll (not shown) rotating on a shaft 23 in the overvarnish unit indicated generally by reference numeral 24. Cans 16 with decorations and protective coatings thereon are then transferred from the mandrels to suction cups (not shown) mounted adjacent the periphery of a transfer wheel (not shown) rotating on a shaft 28 of a transfer unit 27. From the transfer unit 27 the cans 16 are deposited on generally horizontal pins 29 carried by a chain-type output conveyor 30, which carries the cans 16 through a curing oven (not shown).

While moving toward engagement with an undecorated can 16, the blanket engages a plurality of plate cylinders 31, each of which is associated with an individual inking station 32 (exemplary eight inking stations 32 are shown in FIG. 1). Typically, each inking station 32 provides a different color ink and each plate cylinder 31 applies a different ink image segment to the blanket. All of the "ink image" segments combine to produce a "main image" that is structured to be applied to the can body. The "main image" is then transferred to undecorated cans 16 and becomes, as used herein, the "can body applied image."

Each inking station 32 includes a plurality of rollers, or as used herein, "rolls," that are structured to transfer a quantity of ink from a reservoir, or as used herein an "ink fountain," to the blanket. The path that the ink travels is, as used herein, identified as the "ink train." That is, the rolls over which the ink travels define the "ink train." Further, as used herein, the "ink train" has a direction with the ink fountain being at the "upstream" end of the ink train and a plate cylinder 31 at the "downstream" end of the ink train.

The ink train extends over a number of rolls each of which has a purpose. As shown, the ink train starts at the ink fountain and is initially applied as a film to a fountain roll. The fountain roll is intermittently engaged by a ductor roll. When the ductor roll engages the fountain roll, a quantity of ink is transferred to the ductor roll. The ductor roll also intermittently engages a downstream roll and transfers ink thereto. The ductor roll has a "duty cycle" which, as used herein, means the ratio of the duration of the ductor roller being in contact with the fountain roller divided by the duration of a complete cycle (ductor roller in contact with the fountain roller, move to the first downstream roller, contact with first steel roller, move back to fountain roller).

The other rolls include, but are not limited to, distribution roll(s), oscillator roll(s), and transfer roll(s). Generally, these rolls are structured to distribute the ink so that a proper amount of ink is generally evenly applied to the plate cylinder 31. For example, the oscillator rolls are structured to reciprocate longitudinally about their axis of rotation so as to spread the ink as it is applied to the next downstream roll. The final roll is the plate cylinder 31 which applies the ink to the blanket. It is understood that each inking station 32 applies an "ink image" of a single selected color to the blanket and that each inking station 32 must apply an ink image in a proper position relative to the other ink images so that the main image does not have offset ink images.

Thus, as used herein, an "ink image" means the image of a single ink color which is part of a "main image." As used herein, a "main image" means an image created from a number of ink images and which is the image that is applied to a can body as the "can body applied image." It is understood that a "main image" includes a number, and typically a plurality, of ink images. For example, if the main image was the French flag (which is a tricolor flag featuring three vertical bands colored blue (hoist side), white, and red), an inking station 32 with blue ink would provide an ink image that is a blue rectangle, an inking station 32 with white ink would provide an ink image that is a white rectangle and an inking station 32 with red ink would provide an ink image that is a red rectangle. Further, presuming that the main image was of a French flag with the hoist side on the left, the inking station 32 with blue ink would provide the blue rectangle ink image on the left side of the blanket, the inking station 32 with white ink would provide the white rectangle ink image on the center of the blanket immediately adjacent the blue rectangle ink image, and the inking station 32 with red ink would provide the red rectangle ink image on the right side of the blanket immediately adjacent the white rectangle ink image. Once all the ink images are applied to the blanket, the main image is formed and then applied to a can body.

The plate cylinder 31 can weigh between 20-40 lbs. and needs to be changed with every label change or new graphics to be applied to the can body. A can plant can perform over ten label changes a day depending on customer order requirements. A decorator will have one plate cylinder per inking station 32 and will have four to eight inking stations 32 per decorator. During each label change, the plate cylinders 31 on the decorator will need to be removed and a different plate cylinder 31 installed. The plate cylinder 31 is currently manually installed by an operator and is guided by a precision keyway shaft. This process can be both time consuming and hazardous as the operator will need to fit the plate cylinder 31 to the exact location of the keyway in addition to having to descend and climb a set of stairs with the plate cylinder 31 being held with two hands, which does not leave an operator with a free hand to stabilize themselves on the stairs. In some cases, the operators hand the plate cylinders 31 overhead as another operator bends down to grab the plate cylinder 31.

Plate cylinders 31 for all inking stations 32 are timed relative to one another by a key that clocks the plate cylinder 31 onto its corresponding plate cylinder shaft. Plate cylinder shafts for each inking station 32 are timed relative to one another at the initial assembly in a factory by clocking the plate cylinder shaft relative to the plate cylinder gear with each inking station's 32 plate cylinder gear being driven by a common bull gear. If a plate cylinder shaft is replaced for maintenance, the entire system will need to be retimed. Additionally, if a keyway is damaged, the corresponding plate cylinder 31 will need to be replaced.

There remains room for improvement in can decorators.

SUMMARY OF THE INVENTION

In accordance with an aspect of the disclosed concept, a can decorator comprises: a plate cylinder shaft; a plate cylinder structured to be installed on the plate cylinder shaft; and a plate cylinder locking and unlocking mechanism structured to selectively lock the plate cylinder to the plate cylinder shaft such that the plate cylinder shaft and plate cylinder rotate in conjunction and to selectively unlock the plate cylinder from the plate cylinder shaft such that the plate cylinder shaft and plate cylinder do not rotate in conjunction and the plate cylinder is permitted to be removed from the plate cylinder shaft, wherein the plate cylinder locking and unlocking mechanism uses at least one of pneumatic, magnetic, and mechanical power to selectively lock and unlock the plate cylinder.

In accordance with an aspect of the disclosed concept, a plate cylinder replacement system for a can decorator having a plurality of inker stations each having a corresponding plate cylinder and plate cylinder shaft, comprises: a robotic arm structured to, for a given inker station, remove the plate cylinder from the plate cylinder shaft and place the removed plate cylinder in a storage location, and to pick up a new plate cylinder from the storage location and install the new plate cylinder on the plate cylinder shaft; and a robotic arm movement system structured to move the robotic arm to each of the plurality of inker stations.

In accordance with an aspect of the disclosed concept, a method for adjusting timing plate cylinders in a can decorator comprises: moving a selected plate cylinder away from a blanket wheel; rotating a bull gear to rotate the selected plate cylinder to a reference position; disengaging the selected plate cylinder such that it does not rotate with rotation of the bull gear; rotating a master plate cylinder to the reference position; reengaging the selected plate cylinder such that it rotates with rotation of the bull gear; and moving the selected plate cylinder against the blanket wheel.

In accordance with an aspect of the disclosed concept, a can decorator comprises: a plurality of inker stations each having a corresponding plate cylinder and plate cylinder shaft; a plate cylinder locking and unlocking mechanism structured to, for at least one of the inker stations, selectively lock the plate cylinder to the plate cylinder shaft such that the plate cylinder shaft and plate cylinder rotate in conjunction and to selectively unlock the plate cylinder from the plate cylinder shaft such that the plate cylinder shaft and plate cylinder do not rotate in conjunction and the plate cylinder is permitted to be removed from the plate cylinder shaft, wherein the plate cylinder locking and unlocking mechanism uses at least one of pneumatic, magnetic, and mechanical power to selectively lock and unlock the plate cylinder; a plate cylinder replacement system including: a robotic arm structured to, for a given inker station, remove the plate cylinder from the plate cylinder shaft and place the removed plate cylinder in a storage location, and to pick up a new plate cylinder from the storage location and install the new plate cylinder on the plate cylinder shaft; and a robotic arm movement system structured to move the robotic arm to each of the plurality of inker stations; and a control system structured to perform timing adjustment, the control system structured to control the can decorator to: move a selected plate cylinder away from a blanket wheel; rotate a bull gear to rotate the selected plate cylinder to a reference position; disengage the selected plate cylinder such that it does not rotate with rotation of the bull gear; rotate a master plate cylinder to the reference position; reengage the selected plate cylinder such that it rotates with rotation of the bull gear; and move the selected plate cylinder against the blanket wheel.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Example embodiments of the disclosed concept provide mechanisms for locking and unlocking a plate cylinder from a plate cylinder shaft to assist with removal and replacement of a plate cylinder on a plate cylinder shaft. Example embodiments of the disclosed concept also remove the keying between the plate cylinder and plate cylinder shaft. In some example embodiments of the disclosed concept, a robotic system is provided for assistance with removing and replacing a plate cylinder on a plate cylinder shaft. In some example embodiments, a system and process are provided for automatically setting plate cylinder timing in a can decorator. Example embodiments of the disclosed concept will be described in more detail herein.

Figure 2A:
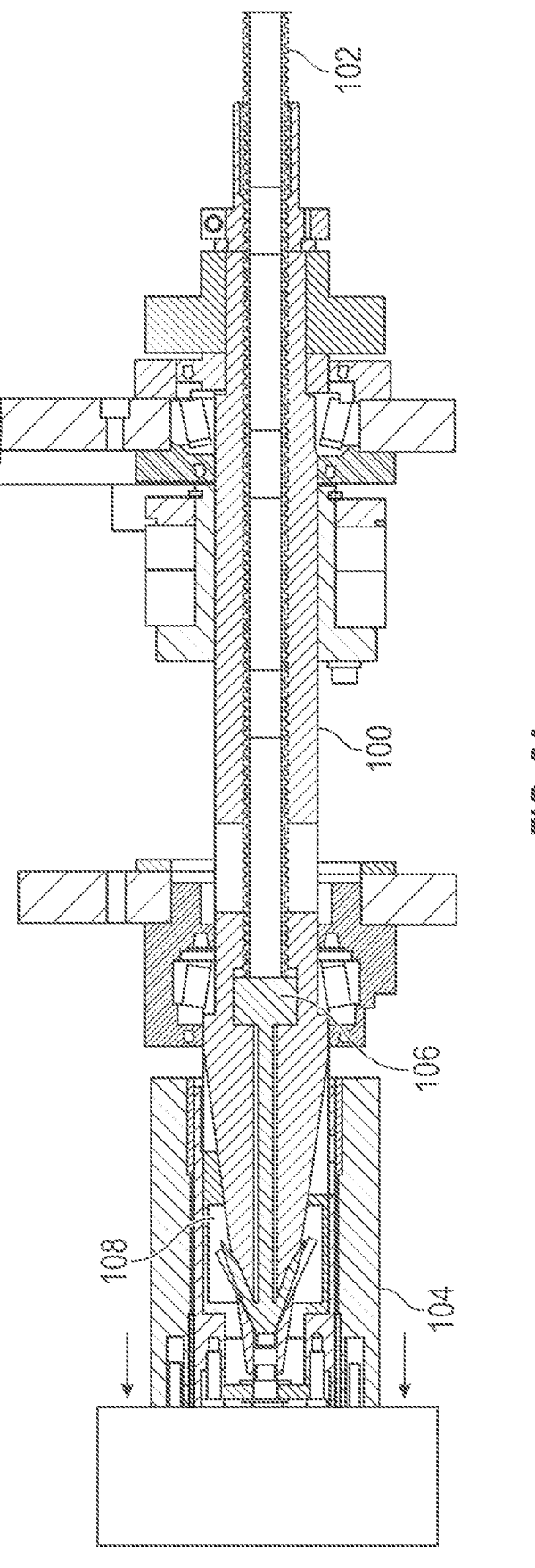
FIG. 2A is a cross-section view of a plate cylinder shaft in accordance with an example embodiment of the disclosed concept.
Figure 2B:
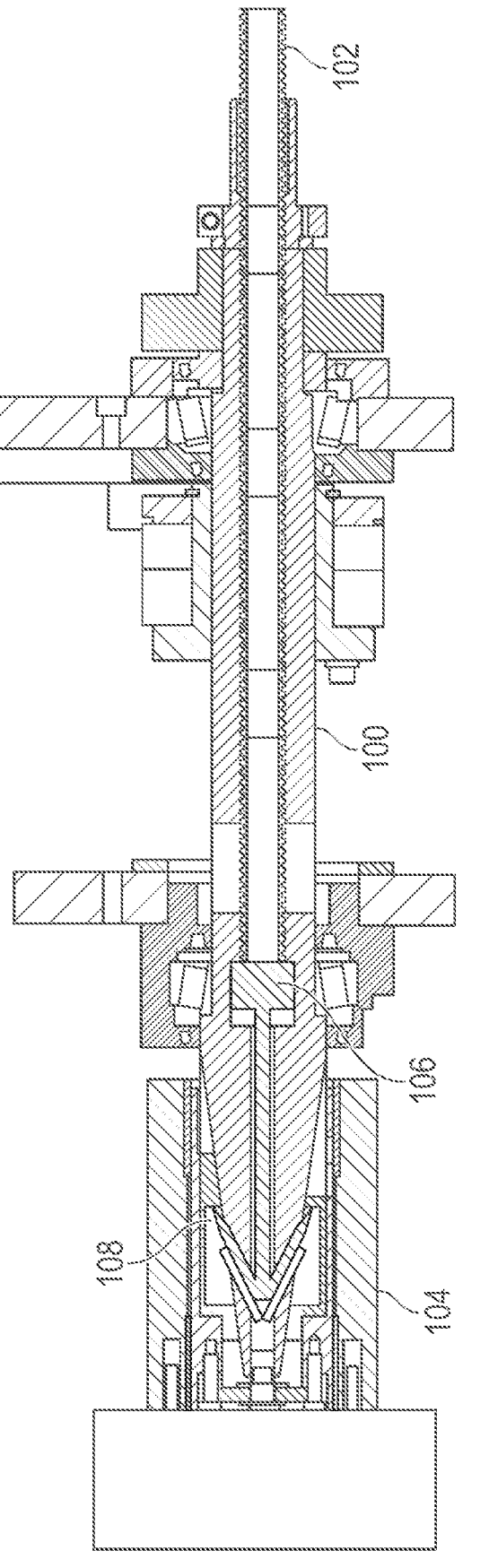
FIG. 2B is another cross-section view of the plate cylinder shaft of FIG. 2A.

FIGS. 2A-B are cross-section views of a plate cylinder shaft 100 for a can decorator in accordance with an example embodiment of the disclosed concept. The example embodiment shown in FIGS. 2A-B provide a mechanism for locking and unlocking a plate cylinder 104 from a plate cylinder shaft 100. The plate cylinder shaft 100 includes a ball screw 102 extending through a central portion of the plate cylinder shaft 100 and a ball nut 106 disposed within the plate cylinder shaft 100. The ball nut 106 is structured to interact with a mechanical locking pin or shaft 108 to facilitate locking or unlocking the plate cylinder 104 from the plate cylinder shaft 100. For example, rotation of the ball screw 102 causes the ball nut 106 to extend or retract. The extension or retraction of the ball nut 106 in turn causes the mechanical locking pin or shaft 108 to extend to interact with the plate cylinder 104 to lock the plate cylinder 104 to the plate cylinder shaft 100 or retract to unlock the plate cylinder 104 from the plate cylinder shaft 100. When the plate cylinder 104 is locked to the plate cylinder shaft 100, the plate cylinder 104 will rotate in conjunction with the plate cylinder shaft 100 and the decorator can perform normal operations. When the plate cylinder 104 is unlocked from the plate cylinder shaft 100, the plate cylinder 104 can be removed from the plate cylinder shaft 100. Rotation of the ball screw 102 to lock or unlock the plate cylinder 104 can be performed by a motor or other mechanism attached to the ball screw 102. The process of locking or unlocking the plate cylinder 104 can be automated such that a technician need not manually interact with the plate cylinder 104 to lock or unlock it.

Figure 3:
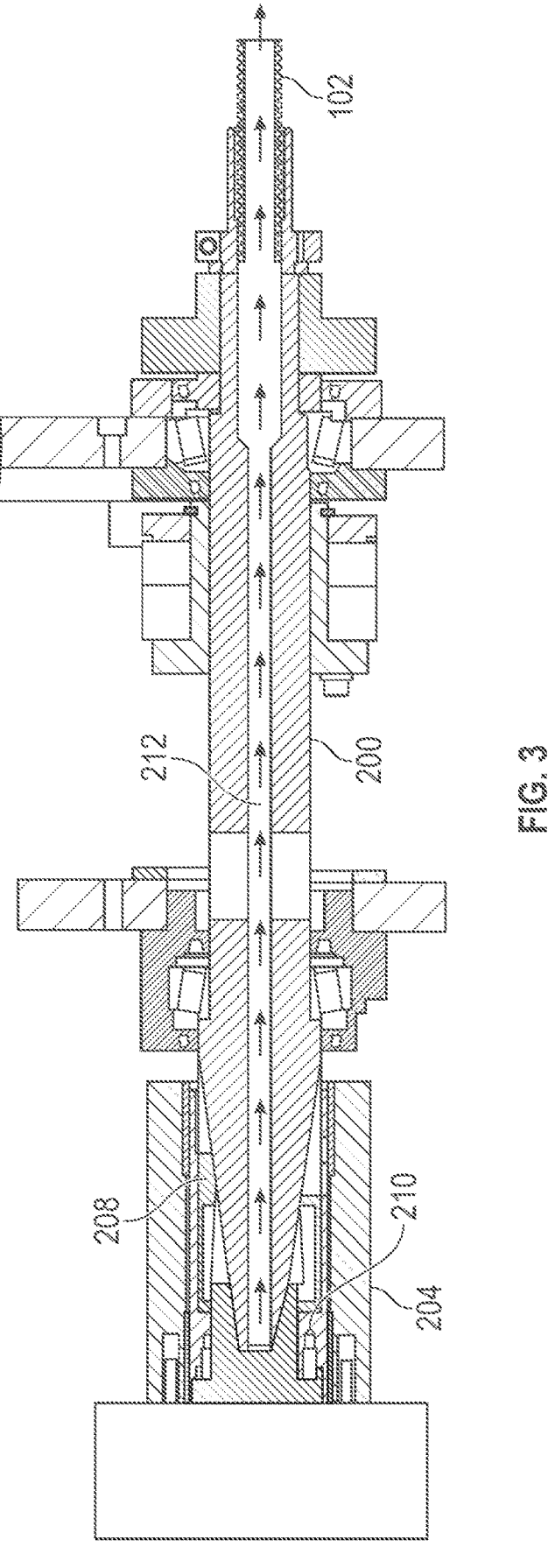
FIG. 3 is a cross-section view of a plate cylinder shaft in accordance with another example embodiment of the disclosed concept.

FIG. 3 is a cross-section view of a plate cylinder shaft 200 for a can decorator in accordance with another example embodiment of the disclosed concept. The example embodiment shown in FIG. 3 provides another mechanism for locking a plate cylinder 204 from a plate cylinder shaft 200. The plate cylinder shaft 200 includes a hollow chamber 212 extending along its interior length. The plate cylinder 204 includes a vacuum seal 210 structured to correspond to an end of the hollow chamber 212. The hollow chamber 212 is attached to a vacuum system structured to selectively provide a vacuum in the hollow chamber 212. When the vacuum is applied, the vacuum seal 210 of the plate cylinder 204 is pulled toward the plate cylinder shaft 200, which results in the plate cylinder shaft 200 interacting with a mechanical locking pin or shaft 208 structured to lock the plate cylinder 204 to the plate cylinder shaft 200 such that the plate cylinder 204 rotates in conjunction with the plate cylinder shaft 200 and the decorator can be normally operated. Removing the vacuum removes the vacuum force and unlocks the plate cylinder 204 from the plate cylinder shaft 200 such that the plate cylinder 204 can be removed from the plate cylinder shaft 204. The process of selectively applying the vacuum to the hollow chamber 212 to lock or unlock the plate cylinder 204 can be automated such that a technician need not manually interact with the plate cylinder 204 to lock or unlock it.

Figure 1:
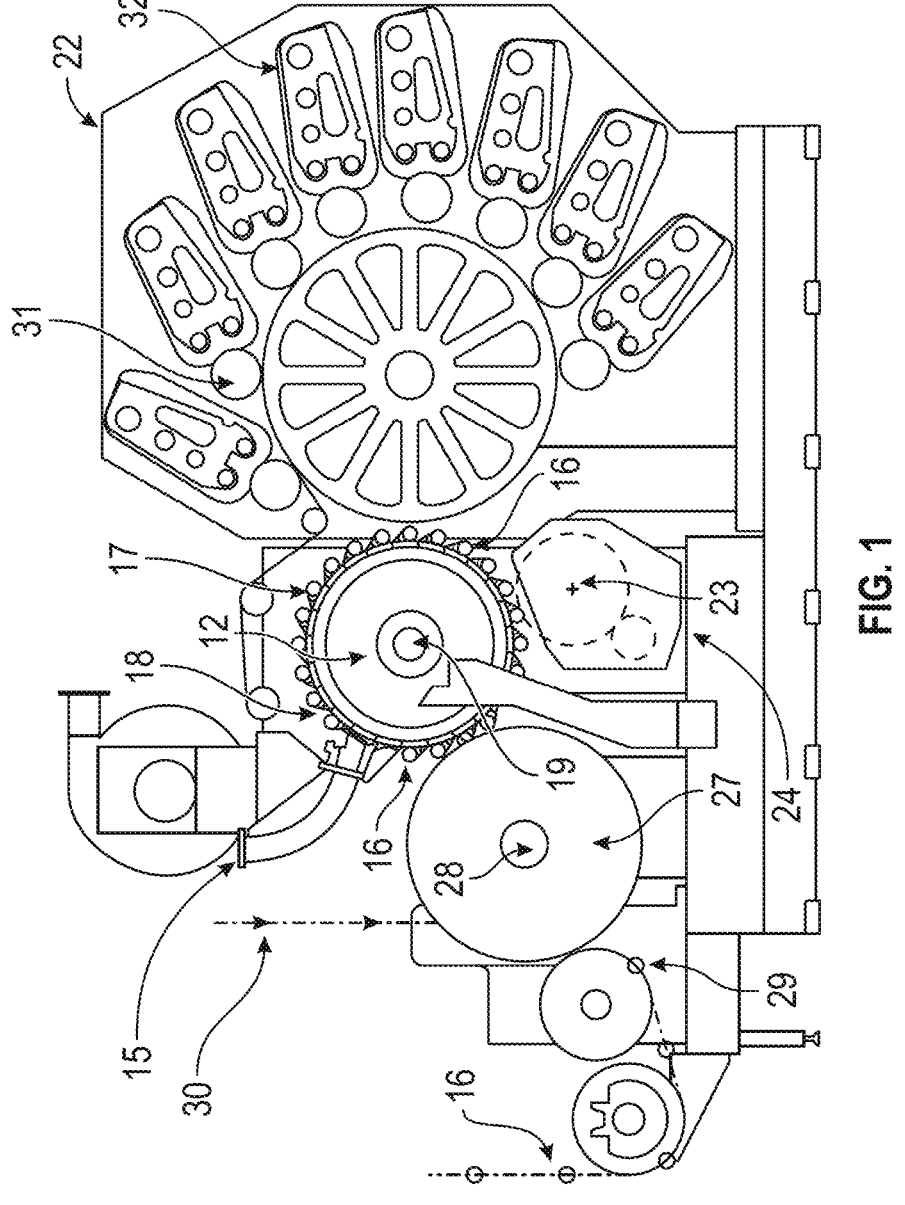
FIG. 1 is a side elevation view of a can decorator machine.

It will be appreciated that the example embodiment shown in FIGS. 2A-2B and the example embodiment shown in FIG. 3 may be used, for example, in a can decorator such as that shown in FIG. 1, in similar can decorators, or in other types of can decorators without departing from the scope of the disclosed concept. It will also be appreciated that modifications or other types of mechanisms for locking or unlocking a plate cylinder and plate cylinder shaft may be employed without departing from the scope of the disclosed concept.

Figure 4:
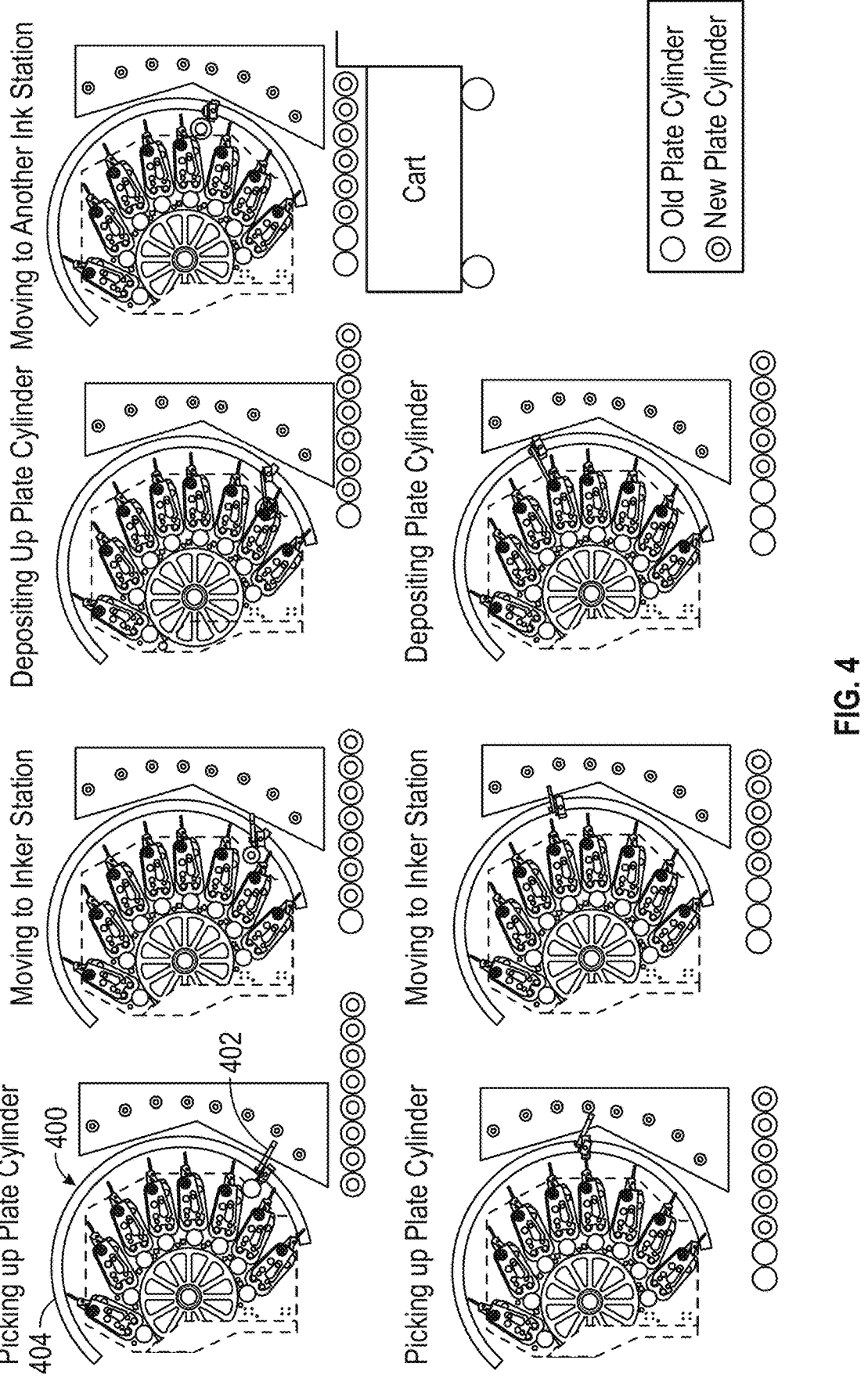
FIG. 4 is a view of a process of replacing a plate cylinder in accordance with an example embodiment of the disclosed concept.

FIG. 4 shows a process for removing and replacing a plate cylinder with a robotic arm 402 in accordance with an example embodiment of the disclosed concept. FIG. 4 shows seven examples of the process including, in order from upper left to bottom right, picking up a plate cylinder, moving to an inker station, depositing the plate cylinder, moving to another inker station, picking up a plate cylinder, moving to an inker station, and depositing the plate cylinder. The process shown in FIG. 4 is illustrated in use with a can decorator having eight inker stations, each having its own plate cylinder. A robotic arm movement system 400 using a robotic arm 402 installed on a track 404 is used to implement the process. The robotic arm 402 is structured to remove a plate cylinder from an inker station and place the plate cylinder in a storage location such as, for example, a rack or cart. The robotic arm 402 is also structured to pick up a plate cylinder from the storage location and install the plate cylinder in an inker station. The robotic arm 402 is also structured to move along the track 404 to access any of the inker stations of the decorator.

As shown in the various example steps of the process, the robotic arm 402 may remove and pick up a plate cylinder from an inker station, place the plate cylinder in the storage location, pick up a new plate cylinder from the storage location, and install the new plate cylinder in the inker station. The robotic arm 402 may move along the track 404 to access any of the inker stations. In this manner, the process of removing and replacing plate cylinders may be performed without the need for a technician to physically move, remove, or install plate cylinders in inker stations.

It will be appreciated that the robotic arm movement system 400 may be employed in can decorators having any number of inker stations and the decorator having eight inker stations is only provided as an example. It will also be appreciated that the disclosed concept is not limited to a robotic arm 402 on a track 404 as shown in the example embodiment of FIG. 4. Other types of robotic systems capable of picking up plate cylinders may be employed without departing from the scope of the disclosed concept.

In some example embodiments, the robotic arm movement system 400 may be used in conjunction with the example embodiments shown in FIGS. 2-3. For example, the mechanisms used to lock and unlock the plate cylinder from the plate cylinder shaft shown in FIGS. 2-3 may be employed to unlock a plate cylinder from the plate cylinder shaft before the robotic arm 402 removes the plate cylinder, and then lock the new plate cylinder to the plate cylinder shaft after the robotic arm 402 installs the new plate cylinder. It will also be appreciated that other mechanisms for locking and unlocking the plate cylinder may be employed without departing from the scope of the disclosed concept. The robotic arm movement system 400 combined with the mechanism for automating locking and unlocking of the plate cylinder allows removal and replacement of plate cylinders without the need for a technician to physically access the plate cylinders.

Figure 5:
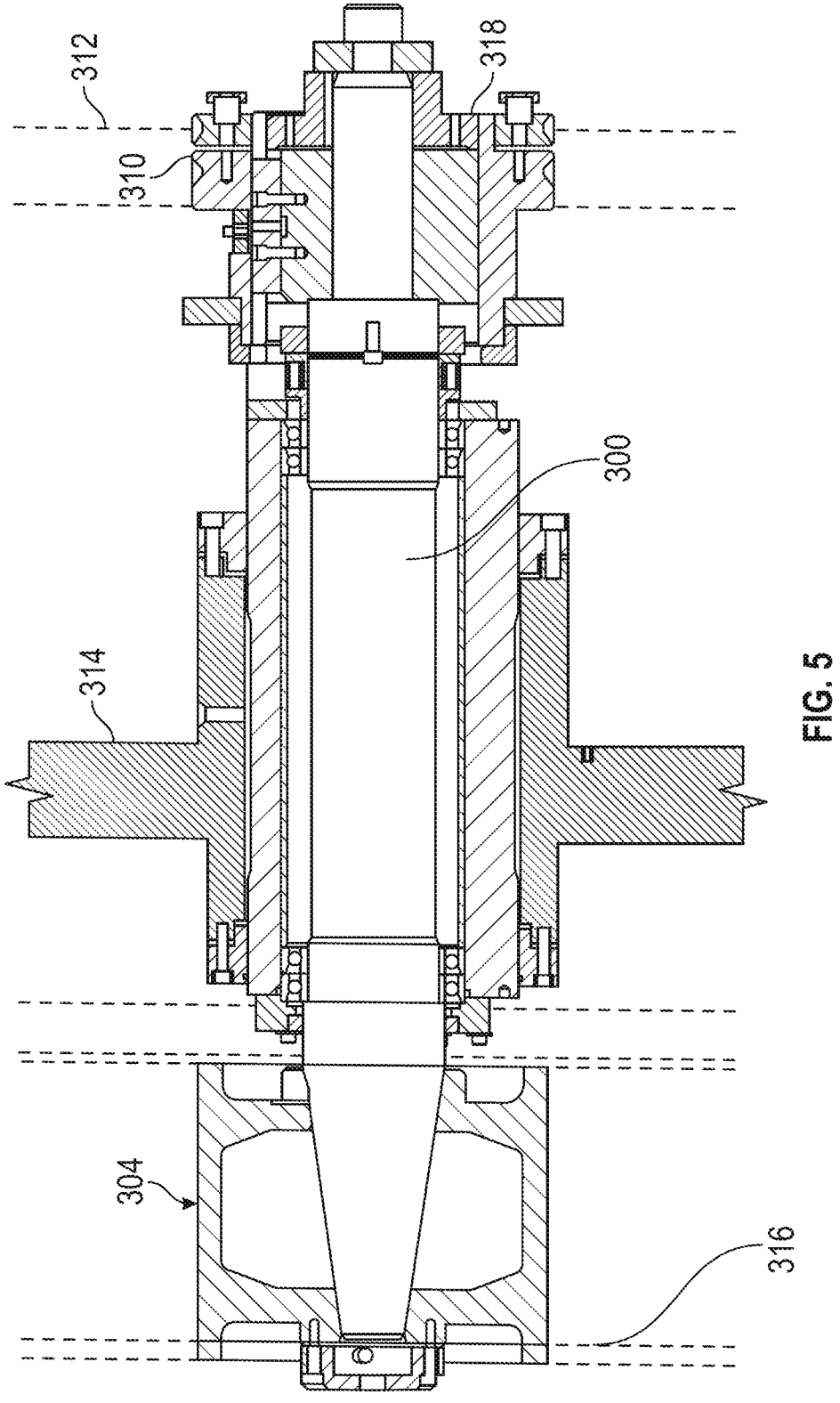
FIG. 5 is a cross-section view of a plate cylinder shaft in accordance with an example embodiment of the disclosed concept.
Figure 6:
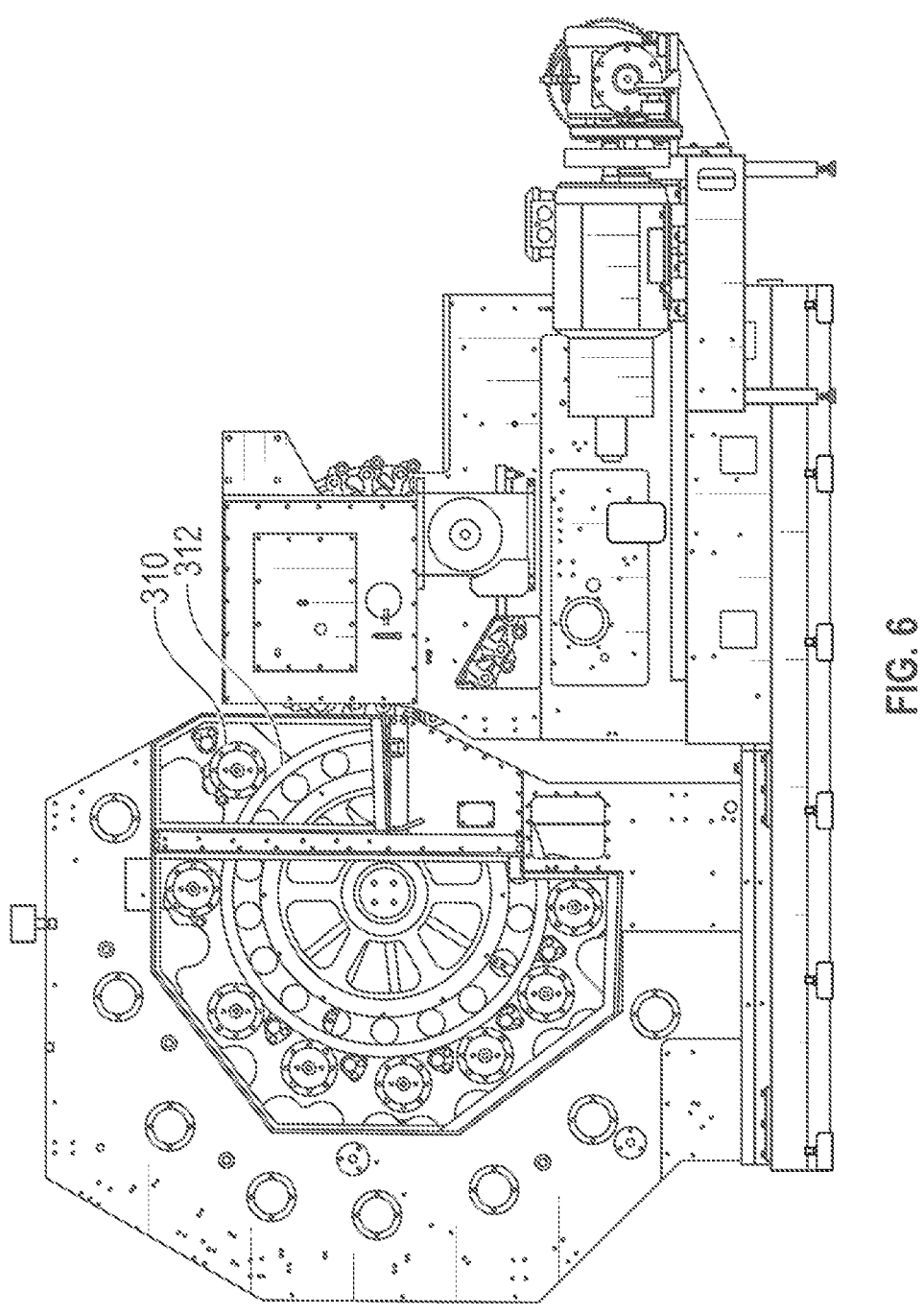
FIG. 6 is a rear view of a decorator in accordance with an example embodiment of the disclosed concept.

FIG. 5 is a cross-section view of a plate cylinder shaft 300 in accordance with an example embodiment of the disclosed concept, and FIG. 6 is a rear view of a decorator in accordance with an example embodiment of the disclosed concept. As shown in FIG. 5 a plate cylinder 304 is installed on the plate cylinder shaft 300. The plate cylinder 304 is disposed proximate a blanket wheel 316 in order to transfer images to cans carried on the blanket wheel 316. The plate cylinder shaft 300 is attached to an inker frame 314 to secure its position. A plate cylinder gear 310, a bull gear 312, and a clutch 318 are also shown. The clutch 318 is structured to engage such that the plate cylinder shaft 300 rotates in conjunction with the plate cylinder gear 318 and to disengage to allow the plate cylinder shaft to rotate independent of the plate cylinder gear 310. The bull gear 312 is structured to interact with the plate cylinder gear 310 to cause the plate cylinder gear 310 to rotate. The bull gear 312 is a larger gear that is structured to simultaneously interact with plate cylinder gears 310 corresponding to each inker station in a can decorator. That is, when the bull gear 312 rotates, it causes all plate cylinder gears 310 in the can decorator to simultaneously rotate. The mechanisms shown in FIGS. 5-6 are used for a process of automatically adjusting timing of the can decorator, which will be described in more detail herein.

In the example embodiments shown in FIGS. 2-3, mechanisms are shown that automate locking and unlocking of a plate cylinder. These mechanisms also remove keying between the plate cylinder and plate cylinder shaft. Keying had previously been the mechanism to ensure proper timing of the can decorator after a plate cylinder had been removed and replaced. Without keying, a process is needed to adjust timing when a plate cylinder is replaced.

In accordance with some example embodiments of the disclosed concept, removal and replacement of a plate cylinder is performed by unlocking the plate cylinder using one of the embodiments of FIGS. 2-3 or a similar automated unlocking mechanism. A system such as the robotic arm movement system 400 of FIG. 4 may then be used to remove and replace the plate cylinder, and then one of the embodiments of FIGS. 2-3 or a similar automated locking mechanism may be used to lock the plate cylinder. Once the plate cylinder is locked, the following timing adjustment process may be performed to adjust the timing. It will be appreciated that the following timing adjustment process may be used in conjunction with automated locking and unlocking mechanism and the robotic arm movement system 400 or independently from such systems. That is, the following timing adjustment process may be employed in other types of decorators without departing from the scope of the disclosed concept.

In an example embodiment of the timing adjustment process, plate cylinders include a position indicator. For example, a plate cylinder may include a marking or other type of indicator at a specified position on the plate cylinder which serves as a reference for the rotational position of the plate cylinder. As an example, when the plate cylinder is positioned so that the indicator is at the top of the plate cylinder the position may be referred to as position zero. However, it will be appreciated that the position of the indicator may be varied without departing from the scope of the disclosed concept. As a first step of the process, the newly installed plate cylinder is moved away from the blanket wheel. This step may be achieved manually, or automatically in decorators with an automated plate pressure adjustment system. As a second step of the process, another inker station (different from the where the plate cylinder was newly installed) is selected as the master station and the bull gear 312 is rotated, which in turn causes the plate cylinder gears, plate cylinder shafts, and plate cylinders to rotate, until the master station's plate cylinder is at position zero. In this position, the can decorator is considered to be at position zero. It will be appreciated that any station other than where the plate cylinder was newly installed can be the master station. As a third step of the process, the bull gear 312 continues to rotate until the newly installed plate cylinder is in position zero.

In the fourth step of the process, the clutch 318 corresponding to the newly installed plate cylinder is disengaged, which allows the plate cylinder gear 310 corresponding to the newly installed plate cylinder to rotate independently of the plate cylinder shaft 300 corresponding to the newly installed plate cylinder. That is, continued rotation of the bull gear 312 will not cause the newly installed plate cylinder to rotate away from position zero. In some example embodiments, a plate cylinder shaft brake may be employed in addition to disengaging the clutch 318 in order to prevent any unintended rotation of the newly installed plate cylinder. However, in some embodiments, the plate cylinder shaft brake may be omitted as frictional forces may be sufficient to prevent unintended rotation. As a fifth step of the process, while the clutch 318 is disengaged, the bull gear 312 continues to rotate until the plate cylinder for the master station reaches position zero. During this rotation, the newly installed plate cylinder is disengaged and does not rotate.

In the sixth step of the process, when the plate cylinder for the master station reaches position zero, the clutch 318 corresponding to the newly installed plate cylinder is engaged such that the plate cylinder gear 310 and plate cylinder shaft 300 corresponding to the newly installed plate cylinder again rotate in conjunction. In embodiments where a plate cylinder shaft brake is employed, the plate cylinder shaft brake is disengaged in this step as well. Additionally, in this step, the newly installed plate cylinder is moved back against the blanket wheel either manually, or automatically with a plate pressure adjustment system. At this point, the newly installed plate cylinder is considered to be in-time with the plate cylinder for the master station. That is, both plate cylinders will be at position zero and will rotate in conjunction with each other in response to rotation of the bull gear 312. The process may be repeated for any other newly installed plate cylinder.

In some example embodiments, the timing adjustment process may be modified to simultaneously adjust the timing of multiple plate cylinders. For example, multiple newly installed plate cylinders may be moved away from the blanket wheel. Then, as the bull gear 312 rotates, the positions of the plate cylinders may be monitored, and as each plate cylinder reaches position zero, its corresponding clutch may be disengaged such that the plate cylinder remains in position zero. In this manner, multiple newly installed plate cylinders may be set to position zero through a single rotation of the bull gear 312. When all newly installed plate cylinders reach position zero, the plate cylinder for the master station may be set to zero and then the clutches for each newly installed plate cylinder may be engaged and the newly installed plate cylinders may be moved back against the blanket wheel.

In some example embodiments of the disclosed concept, an electronic sensor may be used to determine the position of a plate cylinder. The electronic sensor may be operably connected to a control system that also controls rotation of the bull gear, movement of plate cylinders against and away from the blanket wheel, engagement and disengagement of clutches, application of any plate cylinder shaft brakes, etc. In this manner, timing adjustment of plate cylinders can be controlled automatically without the need for physical interaction by a technician.

In some example embodiments, the automatic timing adjustment process is used in conjunction with other example embodiments described herein, such as plate cylinder locking and unlocking mechanisms and the robotic arm movement system 400. When all embodiments are used together, the plate cylinders may be removed and replaced and the can decorator's timing may be automatically adjusted all without physical interaction by a technician. However, it will be appreciated that embodiments disclosed herein may also be employed independently of other embodiments, as each embodiment independently reduces the need for technician interaction with plate cylinders.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A can decorator comprising:
a plate cylinder shaft;
a plate cylinder structured to be installed on the plate cylinder shaft; and
a plate cylinder locking and unlocking mechanism structured to selectively lock the plate cylinder to the plate cylinder shaft such that the plate cylinder shaft and plate cylinder rotate in conjunction and to selectively unlock the plate cylinder from the plate cylinder shaft such that the plate cylinder shaft and plate cylinder do not rotate in conjunction and the plate cylinder is permitted to be removed from the plate cylinder shaft,
wherein the plate cylinder locking and unlocking mechanism uses at least one of pneumatic, magnetic, and mechanical power to selectively lock and unlock the plate cylinder,
wherein the plate cylinder locking and unlocking mechanism includes a ball screw extending through a central portion of the plate cylinder shaft, a ball nut disposed within the plate cylinder shaft, and a mechanical locking pin,
wherein the ball screw is structured to rotate in a first direction to cause the ball nut to extend and cause the mechanical locking pin to interact with the plate cylinder to lock the plate cylinder, and
wherein the ball screw is structured to rotate in a second direction to cause the ball nut to retract and cause the mechanical locking pin to retract from the plate cylinder to unlock the plate cylinder.

2. The can decorator of claim 1, further comprising:
a robotic arm structured to remove the plate cylinder from the plate cylinder shaft and place the removed plate cylinder in a storage location, and to pick up a new plate cylinder from the storage location and install the new plate cylinder on the plate cylinder shaft.

3. A can decorator comprising:
a plate cylinder shaft;
a plate cylinder structured to be installed on the plate cylinder shaft; and
a plate cylinder locking and unlocking mechanism structured to selectively lock the plate cylinder to the plate cylinder shaft such that the plate cylinder shaft and plate cylinder rotate in conjunction and to selectively unlock the plate cylinder from the plate cylinder shaft such that the plate cylinder shaft and plate cylinder do not rotate in conjunction and the plate cylinder is permitted to be removed from the plate cylinder shaft, wherein the plate cylinder locking and unlocking mechanism uses at least one of pneumatic, magnetic, and mechanical power to selectively lock and unlock the plate cylinder, wherein the plate cylinder locking and unlocking mechanism includes a hollow chamber extending along an interior length of the plate cylinder shaft, a vacuum seal disposed at an end of the hollow chamber, and a mechanical locking pin,
wherein the hollow chamber is structured such that applying a vacuum to the hollow chamber pulls the plate cylinder toward the plate cylinder shaft and causes the plate cylinder to interact with the mechanical locking pin to lock the plate cylinder, and
wherein the hollow chamber is structured such that removing the vacuum from the hollow chamber causes the plate cylinder to release from the mechanical locking pin to unlock the plate cylinder.

4. A can decorator comprising:
a plurality of inker stations each having a corresponding plate cylinder and plate cylinder shaft;
a plate cylinder locking and unlocking mechanism structured to, for at least one of the inker stations, selectively lock the plate cylinder to the plate cylinder shaft such that the plate cylinder shaft and plate cylinder rotate in conjunction and to selectively unlock the plate cylinder from the plate cylinder shaft such that the plate cylinder shaft and plate cylinder do not rotate in conjunction and the plate cylinder is permitted to be removed from the plate cylinder shaft, wherein the plate cylinder locking and unlocking mechanism uses at least one of pneumatic, magnetic, and mechanical power to selectively lock and unlock the plate cylinder;
a blanket wheel;
a plate cylinder gear;
a clutch structured to selectively engage the plate cylinder gear such that a corresponding plate cylinder shaft and plate cylinder rotates in conjunction with the plate cylinder gear, and to selectively disengage the plate cylinder gear such that the corresponding plate cylinder shaft and plate cylinder does not rotate in conjunction with the plate cylinder gear; and
a bull gear structured to interact with the plate cylinder gear to cause rotation of the plate cylinder gear.

5. The can decorator of claim 4, further comprising:
a plate cylinder replacement system including:
a robotic arm structured to, for a given inker station, remove the plate cylinder from the plate cylinder shaft and place the removed plate cylinder in a storage location, and to pick up a new plate cylinder from the storage location and install the new plate cylinder on the plate cylinder shaft; and
a robotic arm movement system structured to move the robotic arm to each of the plurality of inker stations.

6. The can decorator of claim 5, wherein the robotic arm movement system includes a track, and wherein the robotic arm is structured to move along the track.

7. The can decorator of claim 4, wherein the plate cylinder locking and unlocking mechanism includes a ball screw extending through a central portion of the plate cylinder shaft, a ball nut disposed within the plate cylinder shaft, and a mechanical locking pin,
wherein the ball screw is structured to rotate in a first direction to cause the ball nut to extend and cause the mechanical locking pin to interact with the plate cylinder to lock the plate cylinder, and
wherein the ball screw is structured to rotate in a second direction to cause the ball nut to retract and cause the mechanical locking pin to retract from the plate cylinder to unlock the plate cylinder.

8. The can decorator of claim 4, wherein the plate cylinder locking and unlocking mechanism includes a hollow chamber extending along an interior length of the plate cylinder shaft, a vacuum seal disposed at an end of the hollow chamber, and a mechanical locking pin, wherein the hollow chamber is structured such that applying a vacuum to the hollow chamber pulls the plate cylinder toward the plate cylinder shaft and causes the plate cylinder to interact with the mechanical locking pin to lock the plate cylinder, and wherein the hollow chamber is structured such that removing the vacuum from the hollow chamber causes the plate cylinder to release from the mechanical locking pin to unlock the plate cylinder.

\* \* \* \* \*